United States Patent

[11] 3,568,843

| [72] | Inventor | Ross M. Brown<br>Palos Verdes Estates, Calif. |
|---|---|---|
| [21] | Appl. No. | 781,912 |
| [22] | Filed | Dec. 6, 1968 |
| [45] | Patented | Mar. 9, 1971 |
| [73] | Assignee | Desalination Systems, Inc.<br>San Diego, Calif. |

[54] WATER STORAGE SYSTEM FOR REVERSE OSMOSIS PURIFICATION UNIT
7 Claims, 6 Drawing Figs.

[52] U.S. Cl. .................................................... 210/321,
210/258, 210/434
[51] Int. Cl. .................................................... B01d 31/00
[50] Field of Search ........................................... 210/109,
116, 257, 258, 321, 136, 433, 434

[56] References Cited
UNITED STATES PATENTS
3,456,803  7/1969  Rak .............................. 210/321X

*Primary Examiner*—Frank A. Spear, Jr.
*Attorney*—Thomas D. Lane

ABSTRACT: Pressure in a tank for storing water purified by a reverse osmosis unit is relieved at a predetermined proportionate pressure level by providing a connection from water in said tank to a restricted elongated flow channel used for control of brine release and pressure control in the reverse osmosis unit. Connection to the flow control channel is made at a point intermediate its ends and preferably at a point closer to the brine release end. The flow control channel may be formed by a spiral groove in a face of one element maintained in contact with an adjoining face of another element, with the tank pressure relief connection at a point preferably from one-tenth to one-half the length of the channel measured from its brine release end.

PATENTED MAR 9 1971

INVENTOR.
ROSS M. BROWN

BY

AGENT.

INVENTOR.
ROSS M. BROWN
BY
AGENT.

WATER STORAGE SYSTEM FOR REVERSE OSMOSIS PURIFICATION UNIT

This invention relates to a water storage system particularly for a reverse osmosis water purification unit.

Purification of brackish water by reverse osmosis is now becoming a recognized commercial process. Reverse osmosis can also be used effectively to treat city water to produce a purified grade comparable to so called "bottled water". A reverse osmosis system used in this manner is often referred to as a home unit, because an individual household installation will produce purified water for drinking, cooking and other purposes where water of "bottled water" quality is required.

The reverse osmosis purifier will run ordinarily continuously, producing product water at a relatively slow rate, so that some storage capacity is required to provide a reasonable supply of purified water for immediate use. Conveniently the purified product water can be fed into a pressure resistant storage tank provided with a diaphragm dividing its interior into two compartments with air in one side and purified water in the other. As purified water is fed into the water side of the tank, the air on the other side of the diaphragm is compressed serving as a source of potential energy or driving force to maintain purified water in its compartment in the tank under pressure higher than atmospheric for distribution to point of use. When the pressure on the purified water side of the diaphragm exceeds a preset value, a pressure relief valve opens and excess product water produced from then on flows out through this valve and down the drain. Such a system is described and claimed in application Ser. No. 728,410 filed May 13, 1968, now U.S. Pat. No. 3,493,496, in which I am joint inventor with Donald T. Bray. Conventional pressure relief valves are, however expensive, they have to be set to provide pressure relief at the desired pressure, and do at times lose adjustment or become inoperable. Ordinarily their adjustment provides a predetermined, fixed pressure at which pressure relief is obtained.

Summarized briefly, this invention provides a water storage system for reverse osmosis purifying apparatus in which impure liquid is supplied under pressure to a module containing a semipermeable membrane, and a flow control device is provided for brine release and to maintain pressure in the module. Purified liquid is temporarily stored in a tank and maintained by suitable means under pressure greater than atmospheric but lower than that at which impure liquid is supplied to said module, the flow control device comprising a restricted elongated channel through which the brine is released. A conduit is provided communicating with the purified water in the purified water storage tank and connected into the restricted elongated channel of the flow control device at a point intermediate its ends. It will be understood that a pressure drop will exist over the length of the restricted, elongated channel of the flow control device and connection of the conduit from the storage tank to a point intermediate the ends of this channel provides pressure relief at a pressure representing a predetermined portion of the total pressure drop along the restricted elongated channel. Thus if the conduit is connected at a point say one-third of the length of the channel, measured from its outlet end, then the relief pressure will be about one-third of the pressure of the liquid at the inlet of the channel. For example, a typical module operated to produce household drinking water may show a brine pressure entering the flow control channel of 50 p.s.i.g. and if the pressure relief conduit is introduced into the control channel at a point one-fifth of its length measured from its outlet end, then pressure will be relieved at about 10 p.s.i.g.; if it is placed one-fourth the channel length then the relief control pressure will be about 12½ p.s.i.g.

Preferably the restricted, elongated channel which comprises the flow control device is formed by an elongated groove in a face or surface of one element which is pressed against a surface of another element to produce a restricted, elongated, enclosed conduit or channel through which brine passes from end to end. An advantageous construction comprises a spiral groove in the face of one element which is pressed against a face of an adjoining element. A simple flow control device constructed along these general principles (but without the pressure relief connection) is described and claimed in application Ser. No. 749,447 filed Aug. 1, 1968 Donald T. Bray inventor, now U.S. Pat. No. 3,504,796, and assigned to the assignee of the instant application. The diameter and depth of the groove as so constructed will be small to provide the necessary restriction of liquid flow which results in desired amount of brine release while maintaining adequate working pressure of liquid in the module.

Preferably, for home unit use, the conduit from the purified liquid storage tank is connected into the flow control channel at a point sufficiently spaced from its output end to maintain a relief pressure for the storage tank of between about 10 p.s.i.g. and 30 p.s.i.g. This will provide adequate pressure for water stored in the tank while still maintaining adequate pressure differential between the purified liquid pressure and impure input liquid pressure of household system (50 to 100 p.s.i.g.) to insure proper purification by reverse osmosis. It will be understood that if the product water pressure rises to a point too close to the impure water input pressure then output of the purification module and purity of the product are likely to be adversely affected. To insure an adequate pressure differential across the membrane it is preferred that the conduit from the purified liquid storage tank be connected to the flow control channel at a point between about one-tenth and one-half its length measured from the brine overflow end.

Construction and operation of the apparatus of this invention will be more readily understood by reference to the annexed drawings in which.

Figure 1:
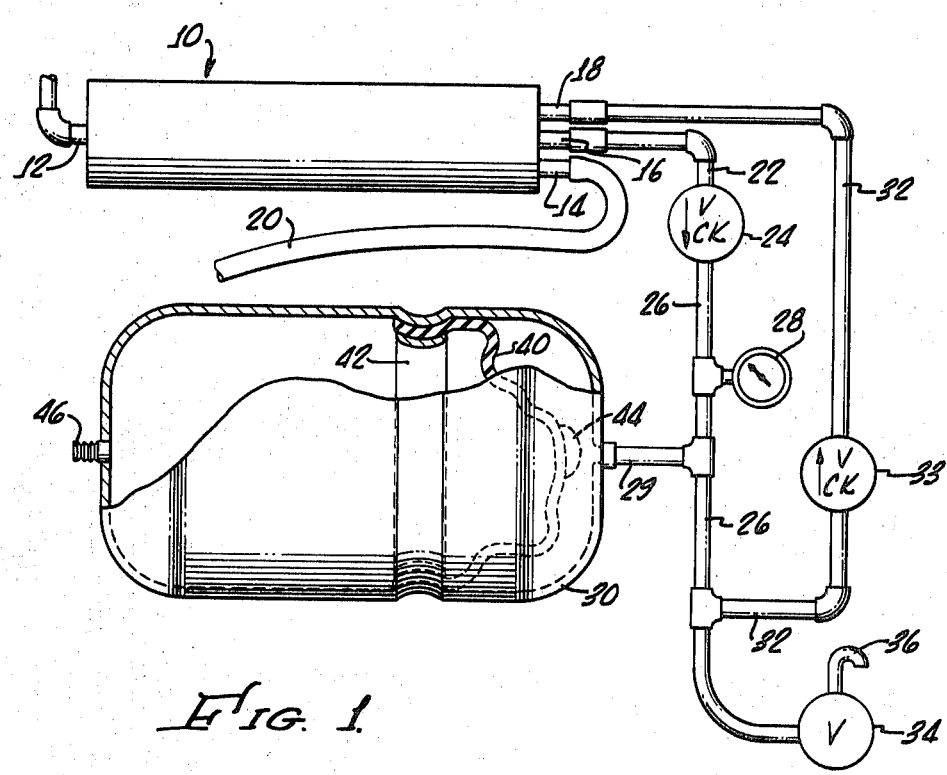
FIG. 1 is a general illustration of a water purifying and storage system embodying features of this invention.
Figure 2:
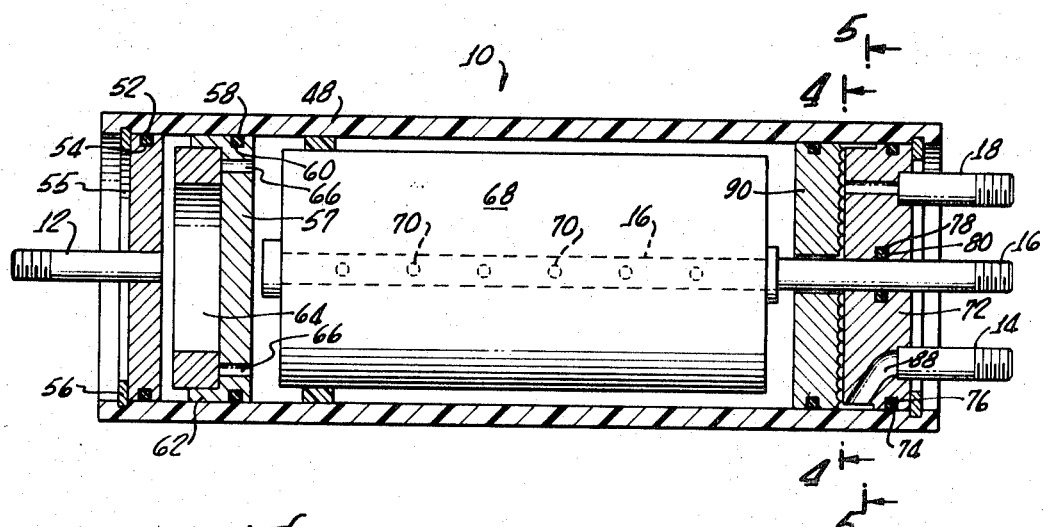
FIG. 2 is a vertical central section of the water purifying unit shown in FIG. 1.
Figure 3:
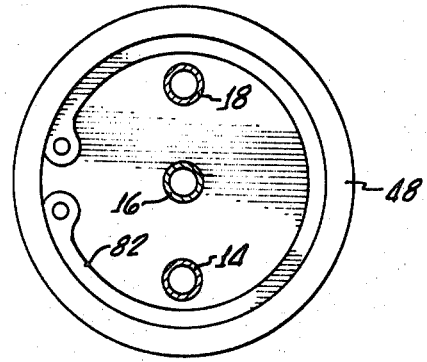
FIG. 3 is an end view of the water purifying unit shown in FIG. 2, being the right-hand end as FIG. 2 is viewed.

Referring now particularly to FIGS. 1, 2 and 3 the system illustrated comprises a water purification unit indicated generally at 10 fitted with an inlet connection 12 to which is connected a suitable supply of water to be purified. Unit 10 at its other end is fitted with a brine outlet connection 14, a purified water connection 16 and a pressure control connection 18. Details of construction of unit 10 are explained in more detail hereinafter.

To connection 14 may be attached a simple tube or hose 20 for transfer of brine to waste or sewer.

Purified water connection 16 is connected by piping 22 to the inlet of check valve 24, the outlet of check valve 24 being connected by piping 26 to pressure gauge 28. Piping 26 also connects to the inlet 29 of purified liquid storage tank 30, to the pressure control line 32, provided with check valve 33, and also to valve 34 which controls the product water use outlet represented as fount 36.

Storage tank 30 is fabricated of suitable pressure resistant material such as metal and is equipped with suitable means for maintaining purified liquid temporarily stored therein at a pressure above atmospheric. Such means, in the embodiment illustrated, comprise a circumferential indentation 38, around tank 30 and inside it arranged a diaphragm of rubber indicated at 40, which overlaps the internal surface of indentation 38 and to which it is maintained in sealing engagement by snap ring 42. Centrally in diaphragm 4 is attached plug 44, which prevents diaphragm 40 from being pressed into the opening of connection 29 of tank 30 when the space at the right-hand side of diaphragm 40 is empty. The space on the left-hand of diaphragm 40 is maintained filled with air at pressure above atmospheric as will be described hereinafter in more detail; air at suitable pressure may initially be introduced by a suitable valved connection as, for example, bicycle tire valve 46.

Purification unit 10, illustrated in more detail in FIGS. 2 to 6, has an outer, suitably pressure resistant casing 48, which together with other elements of its organization may conveniently be fabricated of strong plastic such as polyvinyl chloride. At the left-hand end (as shown) casing 48 is closed by end piece 50 which is sealed to the interior wall of casing 48 by O-ring 52 in groove 54 and which is pierced by inlet connection 12. End piece 50 is maintained in casing 48 by snap ring 55 which bears against its outer face and is snapped into a mating groove 56 in the surface of casing 48. Interiorly is placed plate 57, which is sealed at its edges to the interior wall of casing 48 by O-ring 58 in groove 60. Plate 57 is designed with extending shoulder 62 which forms, with the adjacent area of plate 57, a socket into which is fitted annular filter element 64, which may be of cellulosic material or other conventional filter structure capable of screening or straining particulate matter from the inlet water to be purified. Plate 57 is provided with holes 66 in the way of filter 64 to provide transfer therethrough of filtered water.

Inside casing 48 is also placed spirally wound membrane module 68 which is of conventional design and comprises a semipermeable membrane strip together with a spacing screen and a porous fabric layer to transfer purified water through perforations 70 into the inner tubular portion of purified water connection 16. Such membrane modules are now well known in the art, they have been described in the literature, for example in pages 42 and 43 of the U.S. Department of Interior, Office of Saline Water, Conversion Report for 1964 and similar reports for 1965 and 1966, and they are available commercially. Therefore, they will not be described herein in more detail. In brief, water to be purified enters module 68 edgewise through the left-hand end (in the illustration) and is distributed over the semipermeable membrane by the screen. Purified water passing through the membrane flows through perforations 70 into central collecting and connection tube 16. Brine flows out by the other end of the module 68 (the right-hand end as illustrated) through the screen edge apertures.

Figure 4:
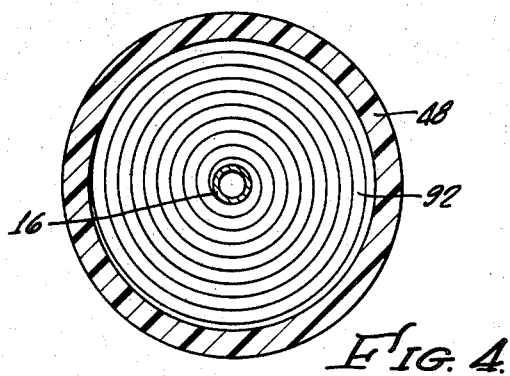
FIG. 4 is a vertical cross section of the unit of FIG. 2 taken along the line 4—4.
Figure 5:
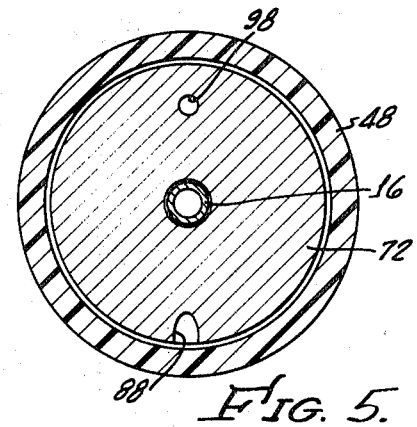
FIG. 5 is a vertical cross section of the unit of FIG. 2 taken along the line 5—5.
Figure 6:
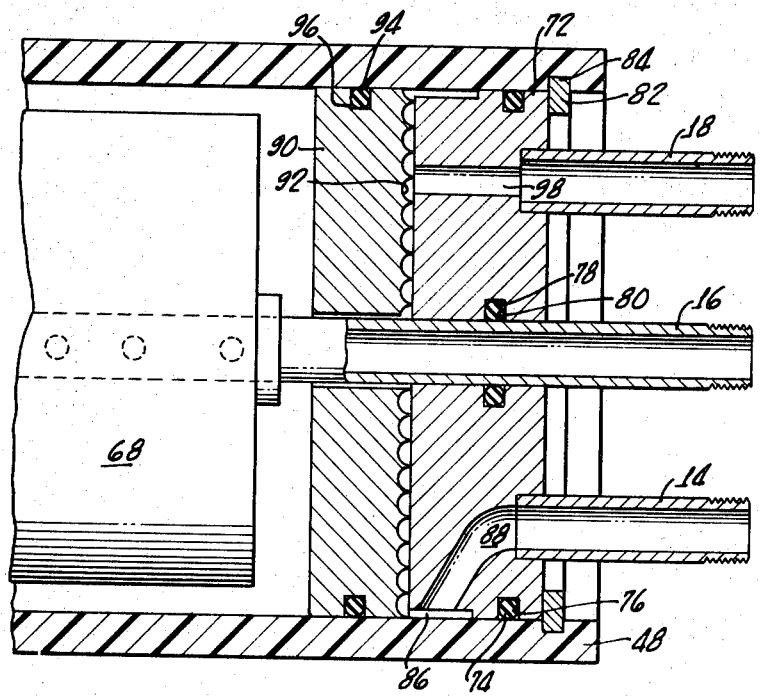
FIG. 6 is an enlarged, fragmentary view, taken in vertical central section, of the output end of the unit of FIG. 2 showing the flow control device and tank pressure control.

Details of the right-hand end of unit 10 may be more readily understood by reference to FIGS. 4 and 5, and particularly to FIG. 6 which shows the flow control device, which is included in casing 48, considerably enlarged and in greater detail.

The right-hand end of unit 10 is sealed by end piece 72 which is sealed to the inner surface of casing 48 by O-ring 74 in groove 76, and is also sealed to tube 16 where this passes through end piece 72 by provision of O-ring 78 in groove 80. End piece 72 is maintained in position by snap ring 82 in groove 84. This end of unit 10 also contains the brine flow control device and the pressure control connection 18 for the purified liquid temporarily stored in tank 30. This is arranged in the illustrated embodiment by provision of a reduced diameter internal end of end piece 72 which forms between it and the adjacent wall of casing 48 an annular space 86. Brine outlet tube 14 is attached into end piece 72, as by a suitable adhesive, and communicates through internal channel 88 with annular space 86.

Positioned interiorly of end piece 72 and adjacent thereto is plug 90 having a spirally grooved face 92 facing and contacting the adjacent plane face of end piece 72. Plug 90 is sealed at its outer edge to casing 48 by O-ring 94 in groove 96 and is bored centrally to form a loose or sloppy fit around purified water connection tube 16. The spiral groove in the face 92 of plug 90 is of such dimensions and design so that when pressed in tight contact with the adjacent face of end piece 72 it forms a restricted, elongated channel from end to end of which the pressure drop is sufficient to regulate brine release at a desired rate, and thus maintain a proper operating pressure inside membrane module 68. Plug 90 and end piece 72 will during operation of the unit be pressed tightly together by pressure of liquid inside casing 48. In the embodiment shown in FIG. 6 brine flows from the end of module 68 through the central bore of plug 90, then through the spiral groove channel, travelling outwardly in this channel toward the edge of plug 90, out into annular space 86, then through channel 88 and out connection tube 14.

According to this invention pressure control line 32 constitutes a conduit communicating with purified liquid under pressure in tank 30, through pipe 26 and tank inlet 29, and this control line 32 is connected to pressure control connection 18 at the end of unit 10 as hereinbefore described. Pressure control connection 18 is attached into plug 72 by suitable means, such as by a suitable adhesive, and its interior end communicates with one end of conduit 98, the other end of conduit 98 communicates with the spiral groove in the face of plug 90 at a point intermediate its ends and preferably as shown closer to the output end than to the input. Placement of the conduit connection in this location provides control for pressure relief for purified water in tank 30 at a predetermined portion of the pressure drop from end to end of the entire spiral groove channel.

The individual spiral groove convolutions in face 92 of plug 90 have been shown in the drawings much enlarged so that they could be represented with reasonable clarity. In practice the groove diameter and spacing will be small to provide the desired flow restriction and may, for example, be 0.030 inches wide by 0.030 inches deep and spaced 0.030 inches apart to provide perhaps 10 gallons of brine release per day with a pressure drop from end to end of the flow control device of 50 p.s.i.g. The pressure drop across the portion from the point of entry of conduit 98 to the end of such a spiral groove may be about 10 p.s.i.g. when operating with an impure water input pressure of about 50 p.s.i.g.

In operation of apparatus according to this invention and having a flow control channel as described by way of example in the above paragraph, air at a pressure of about 2 p.s.i.g. is initially pumped into the tank compartment on the left hand side of diaphragm 40 through bicycle tire valve 46. The inlet 10 is connected to a supply of water to be purified for example a household water system. The product or purified water from reverse osmosis unit 10 is not released at atmospheric pressure but is maintained so that it may be stored in tank 30 under above atmospheric pressure and ready for use. The pressure drop across the semipermeable membrane which provides the driving force for purification by reverse osmosis is the difference between the input water pressure and the purified water output pressure. As the purified water flows into tank 30 and fills the side on the right hand of the diaphragm 40 it compresses air which is present in the compartment on the left hand side of diaphragm 40. As more purified water flows into tank 30 it forces diaphragm 40 to the left, compressing the air in the left hand tank compartment, the purified water pressure, of course, rising correspondingly. This provides temporary storage of purified water in the right-hand compartment of tank 30 under suitable pressure exerted by the compressed air on the other side of diaphragm 40. However, when tank 30 contains its capacity of purified water, or when the purified water pressure rises to an extent that the differential across the membrane is too low and osmotic action in module 68 is adversely affected, then provision must be made for appropriate pressure relief. This is accomplished by provision of pressure control line 32 and its conduit connection into the spiral groove in face 92 of plug 90. Whenever the pressure in tank 30 exceeds the pressure drop across that end of the spiral groove channel between the pressure control connection 98 and its outer end at space 88, then excess purified water will flow through line 32 into the spiral groove channel through conduit 98 and out to waste with the brine. Check valve 33 is necessary at the start of the filling of tank 30 when pressure in purified water line 26 and of the water in tank 30 is less than at the point in groove 92 where connection 98 enters. Without check valve 33 the brine normally flowing out of the end of the spiral could back up through conduit 98 and into line 32, line 26, line 29, and into tank 30.

Withdrawal of water from fount 36, lowers the water pressure in tank 30 and allows entry of additional purified water to again fill the right hand side of the tank. Control is thereupon reestablished by the pressure relationships previously described.

As will be apparent the spiral groove flow control channel may comprise a plurality of sections, for example as formed by grooves on faces of two or more plugs or end pieces, these being suitably connected to form the desired total length for pressure control. The conduit from the purified water storage tank may connect into such a series of groove channel sections at an appropriate point in one of the sections or a section connection to provide the required pressure drop relationship as described.

Pressure control line 32 and its conduit connection into the elongated channel flow control device as described, efficiently and economically solve in important problem in design and operation of temporary water storage systems of the type to which this invention relates. Proper operation of membrane module 68 depends on maintenance of pressure of water in the interior of casing 48 while releasing brine therefrom at a properly controlled rate. This is accomplished by the flow control device which will release brine at its end at atmospheric pressure at predetermined rate while providing sufficient resistance to flow (pressure drop) so that the desired high pressure differential is maintained between the input water (and brine) as it passes through the module and the produce water side of the semipermeable membrane.

In order to provide required reverse osmosis purification in module 68 as well as suitable pressure of purified water in tank 30 for delivery to point of use, it is necessary that the pressure of water in tank 30 be above atmospheric but below the pressure at which feed water is introduced into module 68. The pressure control connection of the instant application provides a simple, efficient economical and automatic method for accomplishing the desired pressure relationship without use of any conventional pressure relief valve. It is extremely simple but effective, and inherently provides a pressure relief level at a definite proportion of the pressure drop across the total length of the spiral groove channel. This is of substantial importance in operation of reverse osmosis purification units particularly those operating at comparatively low pressure, for example, that of a household water supply. In so called home units, the household water pressure is used as driving force for osmotic action but the household water pressure can vary widely. The proportionate pressure relief of this invention will, however, automatically adjust itself to varying input pressures and will maintain a predetermined proportion of the input pressure as driving force for water purification, while also maintaining a proportionate pressure for pressure relief.

I claim:

1. Apparatus in which impure liquid is supplied under pressure to a reverse osmosis module containing a semipermeable membrane, and liquid pressure in said module is maintained by a flow control device through which brine from said module is passed, and in which purified liquid produced by reverse osmosis transfer through said semipermeable membrane is temporarily contained in a storage tank under pressure greater than atmospheric pressure but less than the pressure at which impure liquid is supplied to said module; in which the improvements comprise:
   a. said flow control device comprising a restricted, elongated channel through which said brine is passed from end to end; and
   b. a conduit communicating with the purified liquid under pressure in said storage tank and connected to said restricted, elongated channel of said flow control device at a point intermediate its ends, connection of said conduit to said restricted, elongated channel providing pressure relief for purified liquid temporarily stored in said storage tank at a pressure representing a predetermined portion of the pressure drop along said restricted, elongated channel.

2. Apparatus according to claim 1 in which the point at which said conduit from said temporarily stored purified liquid is connected to said restricted, elongated channel is closer to the brine release end of said channel than to the brine input end.

3. Apparatus according to claim 1 in which the said conduit from said purified liquid storage tank is connected to said restricted, elongated channel at a point to maintain pressure of said temporarily stored purified liquid between about 10 and about 30 p.s.i.g.

4. Apparatus according to claim 1 in which the said conduit from said purified liquid storage tank is connected to said restricted, elongated channel at a point between one-tenth and one-half of its length measured from the brine overflow end.

5. Apparatus according to claim 1 in which said restricted elongated channel through which said brine is passed is formed by one element having an elongated groove in a face pressed against the face of an adjoining element, and said conduit from said temporarily stored purified liquid is connected to said groove at a point intermediate its ends.

6. Apparatus according to claim 1 in which said module containing said semipermeable membrane and said flow control device containing said connection from said purified water storage tank are enclosed in a common casing.

7. Apparatus according to claim 6 in which said restricted, elongated channel through which said brine is passed is formed by a spiral groove in face of a plug inside said casing enclosing said module, said spirally grooved face of said plug being pressed against the adjoining plane surface of an end piece in said casing, and said conduit is connected through said end piece to said spiral groove at a point intermediate its ends.